United States Patent [19]

Notess

[11] Patent Number: 5,243,543
[45] Date of Patent: Sep. 7, 1993

[54] REMOTE LAN SEGMENT TRAFFIC MONITOR

[75] Inventor: Peter C. Notess, Fort Collins, Colo.

[73] Assignee: Hewlett-Packard Company, Palo Alto, Calif.

[21] Appl. No.: 642,610

[22] Filed: Jan. 17, 1991

[51] Int. Cl.$^5$ .............................. G06F 15/76
[52] U.S. Cl. ........................ 364/550; 364/514; 364/DIG. 1; 395/800; 395/650; 370/13; 379/112
[58] Field of Search ......... 364/550, 514, 517, DIG. 1, 364/264.4, DIG. 2, 921.91, 228.1, 244.8, 264.7, 281.4, 281.7, 920, 931.46, 965.9; 379/34, 111-113, 133, 265, 266, 309; 370/13, 17; 395/800

[56] References Cited

U.S. PATENT DOCUMENTS

| | | | |
|---|---|---|---|
| 4,027,289 | 5/1977 | Toman | 364/921.91 |
| 4,769,761 | 6/1988 | Downes et al. | 364/514 |
| 4,849,879 | 7/1989 | Chinnaswamy | 364/264.4 |
| 4,858,152 | 8/1989 | Estes | 364/550 |
| 4,890,278 | 12/1989 | Felter et al. | 370/17 |
| 4,905,171 | 2/1990 | Kiel et al. | 364/550 X |
| 5,067,107 | 11/1991 | Wade | 364/264.4 X |
| 5,109,486 | 4/1992 | Seymour | 364/DIG. 1 |
| 5,146,607 | 9/1992 | Sood et al. | 395/800 |

Primary Examiner—Thomas G. Black
Assistant Examiner—Thomas S. Auchterlonie

[57] ABSTRACT

Disclosed is a system for collecting and displaying statistical data for a plurality of local area networks (LANs). The data is collected in several remote nodes, each of which is attached to a local area network. The data is obtained by using a LAN driver that intercepts all records on the LAN. The records are sent to a collector process where statistics are accumulated into a shared memory area and then transferred to an archiver process in a management node. The archiver process writes the statistics to a history file while compressing older data to prevent the file from growing too large. Several display processes run currently in the management node to display the history data in various ways, updating the displays in a dynamic, real time, mode.

18 Claims, 12 Drawing Sheets

REMOTE LAN SEGMENT TRAFFIC MONITOR

CROSS REFERENCE TO RELATED APPLICATIONS

This application is related to application Ser. No. 07/642733, filed on the same date as this application, of Peter C. Notess, entitled Storage and Display of Historical LAN Traffic Statistics. and it is related to application Ser. No. 07/642604, filed on the same date as this application, of Peter C. Notess, entitled Maintaining Historical LAN Traffic Statistics, all owned by a common entity.

FIELD OF THE INVENTION

This invention relates to Computer Systems and more particularly to communications over Local Area Networks within Computer Systems. Even more particularly, the invention relates to collecting statistics on communications traffic being sent over a Local Area Network.

BACKGROUND OF THE INVENTION

Local area networks (LANs) are designed for high speed data transfer between computers in close proximity. A typical LAN is less than a mile in length, usually within a single building, and transfers data at ten megabits per second. LANs often connect to many computers, and a segment of a LAN may interconnect to other LAN segments forming a network. In order to optimize performance and to isolate errors that occur on a LAN, the data being sent over the LAN needs to be monitored.

One way of monitoring the performance of a LAN is to examine all the packets sent on the LAN, classify them into types, and keep records of how many of each type has been sent over a period of time. To monitor the performance of the LAN over time, these statistical records need to be kept and updated periodically to determine how they have changed during the last time interval.

Most local area networks have a person assigned to the function of network manager. One of the responsibilities of the network manager is to monitor a LAN to assess performance and isolate errors. The network manager needs to be able to monitor LAN segment traffic on several segments of the LAN and view data from each segment simultaneously. This often cannot be done if the manager needs to attach an instrument to a remote LAN segment, because of the difficulty of finding the LAN cable used by the segment, and the difficulty in finding a location for attaching the instrument. Therefore, a network manager needs to be able to collect statistics from a remote LAN segment and transfer these statistics to a management node, where the statistics are kept for a historical record.

One prior art solution to this problem is an instrument called the HP LanProbe. This is a specialized instrument which connects to a LAN segment, collects data from the LAN segment, and transfers this data to a personal computer workstation which displays the data. The personal computer workstation can communicate with many different remote LanProbes. Although the LanProbe instrument maintains some statistical history, it is very limited in duration. Another disadvantage of this solution is that the personal computer can communicate with and display statistics from only one LanProbe at a time, forcing comparative analysis to be done manually. Another disadvantage to this solution is that a dedicated LanProbe instrument must be purchased for each LAN segment to be monitored.

Another solution is the traffic program that runs on SUN Microsystems workstations. This program allows a remote SUN workstation to gather the statistics and then have these statistics displayed on a local SUN workstation. This system, however, does not keep historical data so the network manager must actually be running the tool at the time data needs to be viewed. Another disadvantage of this solution is that the remote collection point of the statistics must also be a compatible workstation running the same operating system.

Because of the speeds at which a LAN operates, and the variety of different record types sent over the LAN, there can be a sizable amount of data to save for each sampling of statistics. Also, the sampling rates need to be reasonably fast to get a detailed picture of the LAN operation. The network manager is forced to trade off between sampling slowly enough to cover the desired time interval in the allotted disk space versus sampling often enough to get the desired level of detail. Furthermore, when displaying this data, there are times when the available data needs to be displayed in as much detail as possible, such as for fault diagnosis, and other times when it should be displayed with less detail, such as for trend analysis.

There is need in the art then for a system to collect data from several remote LAN segments, and collect this data into a management node for viewing. There is also a need in the art for correlating the data from the various remote nodes onto a single display. Still another need is to combine historical data in a manner that reduces the amount of storage space necessary to retain the data while still retaining the peak sample information of the original data. Yet another need is to display the information on a display that allows easy display of historical data with an ability to show various time windows and resolutions.

SUMMARY OF THE INVENTION

It is an aspect of the present invention to monitor a local area network (LAN) to collect statistics on the network.

It is another aspect of the invention to monitor one or more remote segments of the LAN to collect statistics remotely.

Another aspect is to collect and display the remote statistics simultaneously at a single node.

Still another aspect is to collect statistics in each of a plurality of remote nodes, send the statistics to a management node where they are displayed.

The above and other aspects of the invention are accomplished in a system for collecting and displaying statistical data for a plurality of local area networks, that collects the statistical data in several remote nodes which are each attached to a local area network. The statistical data is transferred to a management node where it is stored in a history file and displayed in a variety of ways.

The data is obtained in the remote nodes by using a promiscuous LAN driver that intercepts all records on the LAN, even traffic that is intended for other nodes. These records are sent to a collector process where statistics are accumulated into a shared memory area. An agent process reads the statistics from the shared memory and transfers them to an archiver process in the management node. The archiver process writes the statistics to a history file, compressing the older data in the history file to prevent the file from growing too large.

Several display processes running currently in the management node display the history data in various ways, updating the displays in a dynamic, real time, mode. Each time the history file is compressed, a new compressed file is created, and the display processes detect the compression and dynamically switch from reading the original file to reading the newly created file.

BRIEF DESCRIPTION OF THE DRAWINGS

The above and other objects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
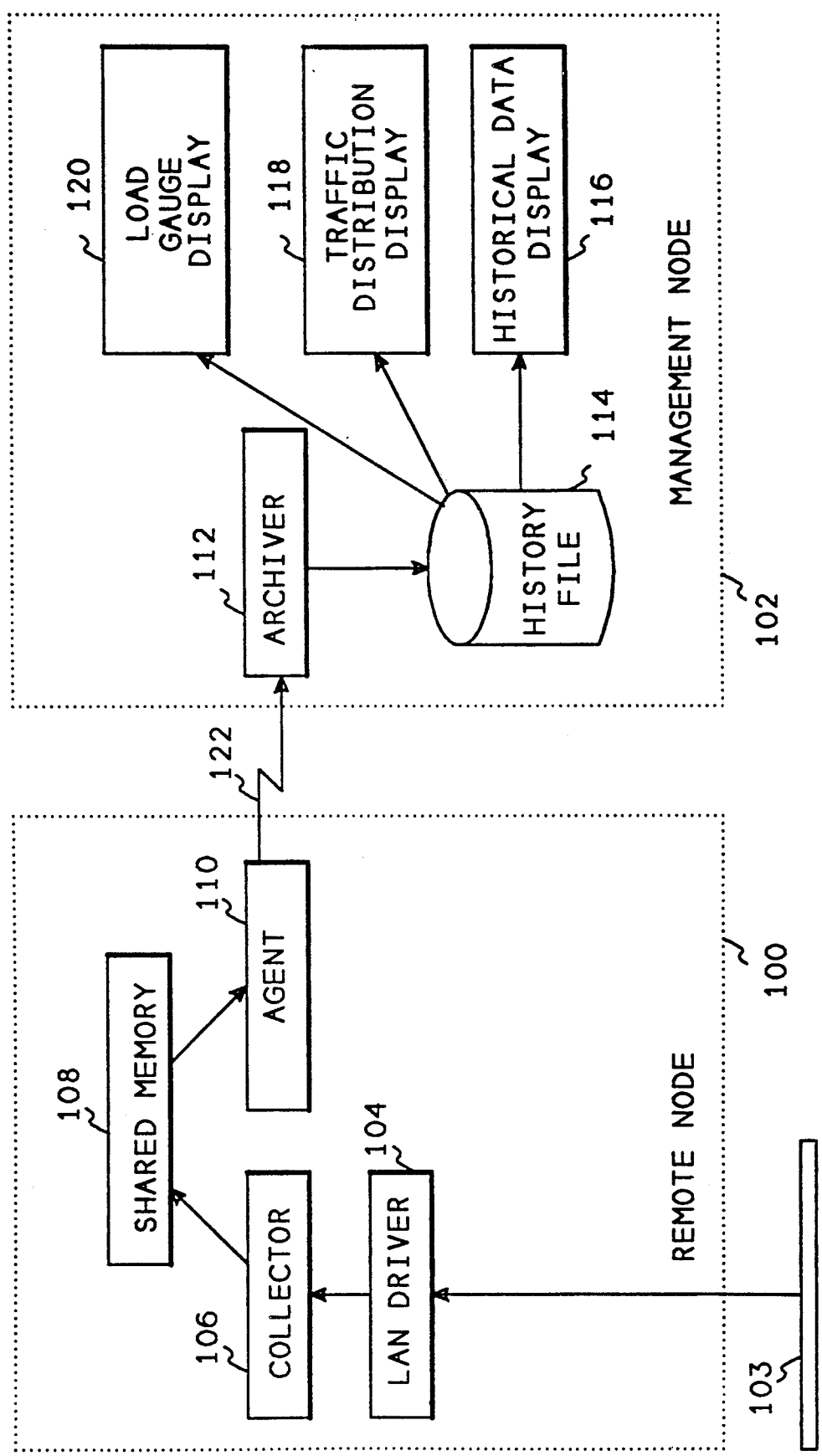
FIG. 1 shows an overall block diagram of the system of the present invention.

FIG. 1 shows an overall block diagram of the system of the present invention. The invention includes several software modules which can run on a multi-tasking operating system, typically the HP-UX operating system. The invention also includes the ability to use many types of statistical collection systems, including work stations, dedicated instruments, or other network elements present in a local area network. Referring now to FIG. 1, a remote node 100 collects statistics which are sent over a communications network 122 to a management node 102. Within the remote node 100, a LAN driver software module 104 receives information from a local area network 103. The LAN driver 104 transfers all the data records (called traffic) received on the LAN 103 to a collector software module 106. The collector module 106 analyzes all the traffic received from the LAN driver 104 and forms statistics based on this traffic. These statistics are then stored in a shared memory 108. The collector 106 and the LAN driver 104 run continuously in the remote node 100 to collect the statistics and store them into the shared memory 108.

When requested by the management node 102, an agent software module 110 reads statistics from the shared memory and transfers them over a communications link 122 to an archiver software module 112 within the management node 102. The communications link 122 and the LAN 103 may be the same communications link. The archiver module 112 stores the statistics into a historical file 114. The archiver module 112 also compresses the historical data. Several display modules 116, 118, and 120 display the data from the historical file 114 in various ways. The historical data display module 116 displays historical information, the traffic distribution display module 118 shows how the various record types on the LAN are distributed, and the load gauge display 120 provides an indication of the amount of traffic on the LAN at a given point in time.

Figure 2:
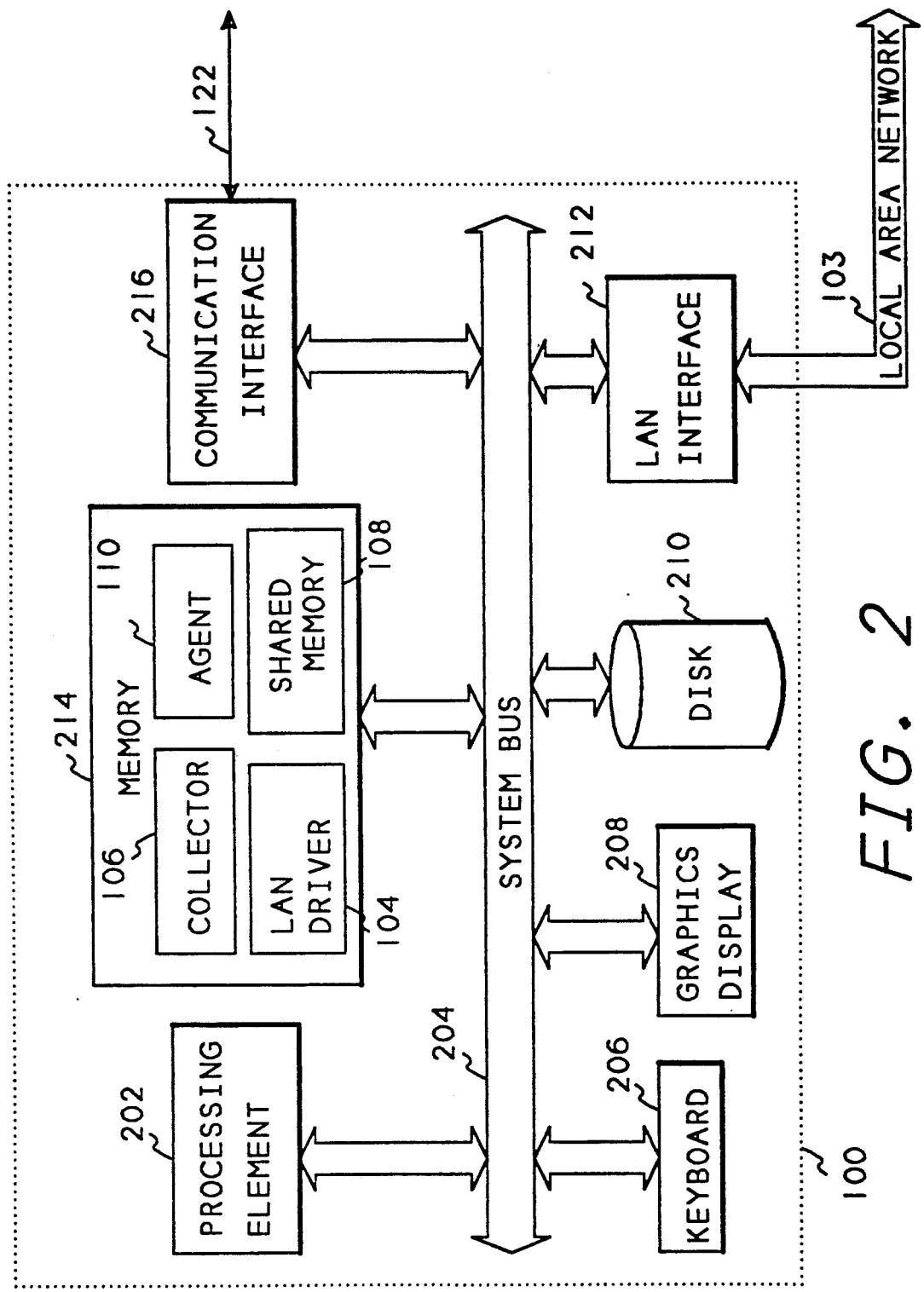
FIG. 2 shows a block diagram of the remote node of FIG. 1.

FIG. 2 shows a block diagram of the remote node 100. Referring now to FIG. 2, a remote node 100 contains a processing element 202 which is connected to other elements of the system over a system bus 204. A keyboard 206 allows a user of the remote node 100 to input data and graphics display 208 allows data to be displayed for the user. A disk 210 contains software and data for use on the remote node 100 and a LAN interface 212 provides the hardware interface to the local area network 103. The LAN interface 212 is used by the LAN driver 104 to obtain data from the LAN 103. A memory 214 contains the software modules and shared memory of the remote node 100. A communications interface 216 is used to send statistical data from this node to the management node over communications link 122. The interface 216 is only necessary if the node 100 does not use the LAN 103 to send the statistical data to the management node 102. The keyboard 206, display 208, and disk 210 would not need to be included in the computer system 100 if the node 100 will not be used for purposes other than collecting LAN statistics. That is, the node 100 may be an independent statistical collection computer system, or the statistical collection system may exist within a node that is also used for other purposes.

Figure 3:
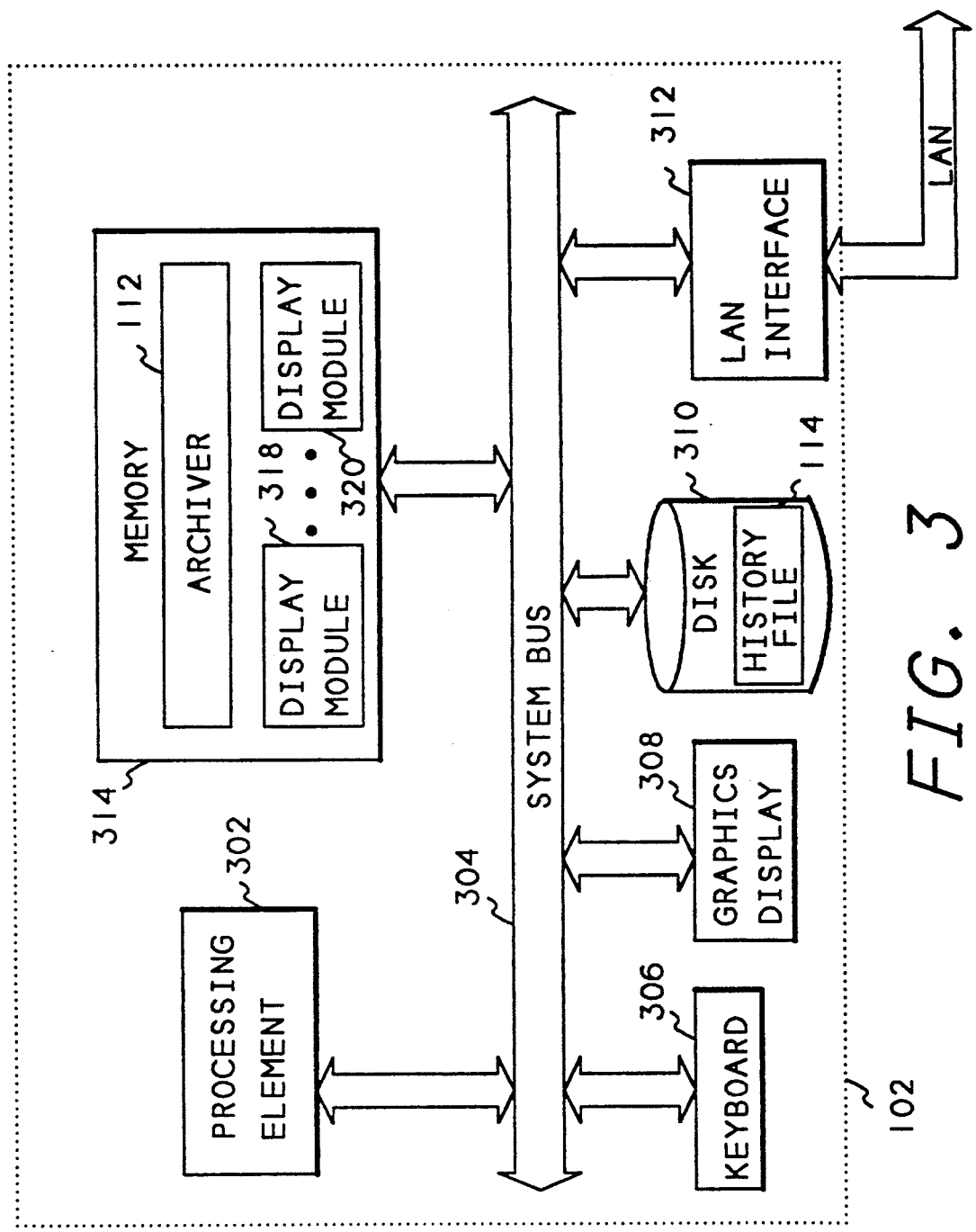
FIG. 3 shows a block diagram of the management node of FIG. 1.

FIG. 3 shows a block diagram of the hardware of the management node 102. Referring now to FIG. 3, the management node 102 contains a processing element 302, which communicates to other elements of the system over a system bus 304. A keyboard 306 allows the user of the management node, such as the network manager, to input information into the node, and a graphics display 308 allows the statistical information collected by the system to be displayed to the network manager. A disk 310 contains the history file 114, and a LAN interface 312 allows the management node to also connect to a local area network for either communication to the remote nodes or for collecting LAN statistics within the management node itself. A memory 314 contains the archiver module 112 as well as the various display modules, indicated by display module 318 and display module 320.

Figure 4:
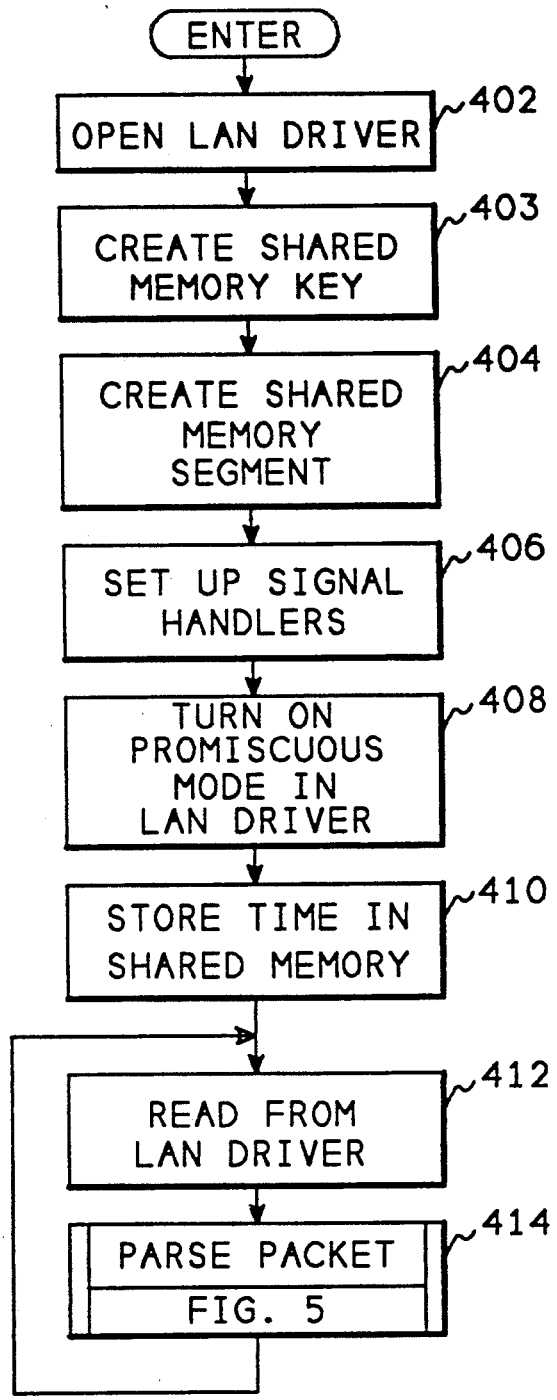
FIG. 4 shows a flowchart of the collector process of FIG. 1.

FIG. 4 shows a flow chart of the collector process 106 of FIG. 1. Referring now to FIG. 4, after entry, block 402 opens the LAN driver 104. The LAN driver software 104 is a standard local area network interface module modified only to return all records sent over the LAN, not just to return records for this particular node. This modification allows the collector software to collect statistics for all nodes connected to the local area network, not just the node in which it resides.

After opening the LAN driver software, block 403 creates a shared memory key for access to shared memory. Block 404 then creates a shared memory segment (108 of FIG. 1) and associates the shared memory key with the shared memory segment. The agent process 110, described below, uses the same shared memory key to allow it to access the shared memory 108. Block 406 then sets up a series of signal handlers, to allow the collector process to handle all interrupts that might occur while it is collecting data. Block 408 then calls the LAN driver software 104 to turn it into promiscuous mode, where it will collect all records transmitted on the LAN. Prior to being set into this promiscuous mode, the LAN driver software would ignore records not intended for this particular node. Block 410 then stores the time of day in shared memory so that the agent process 110 will know the time at which collection of data was started.

Block 412 waits until a buffer of data is available from the LAN driver 104 and it then reads the buffer. Block 414 calls FIG. 5 to process the packets of data in the buffer and assemble the statistics. After return from FIG. 5, block 414 transfers back to block 412 to read the next buffer. This loop continues until the collector process is canceled by the user of the system. The collector process does not terminate by itself, but must be canceled by the user of the system.

Figure 5:
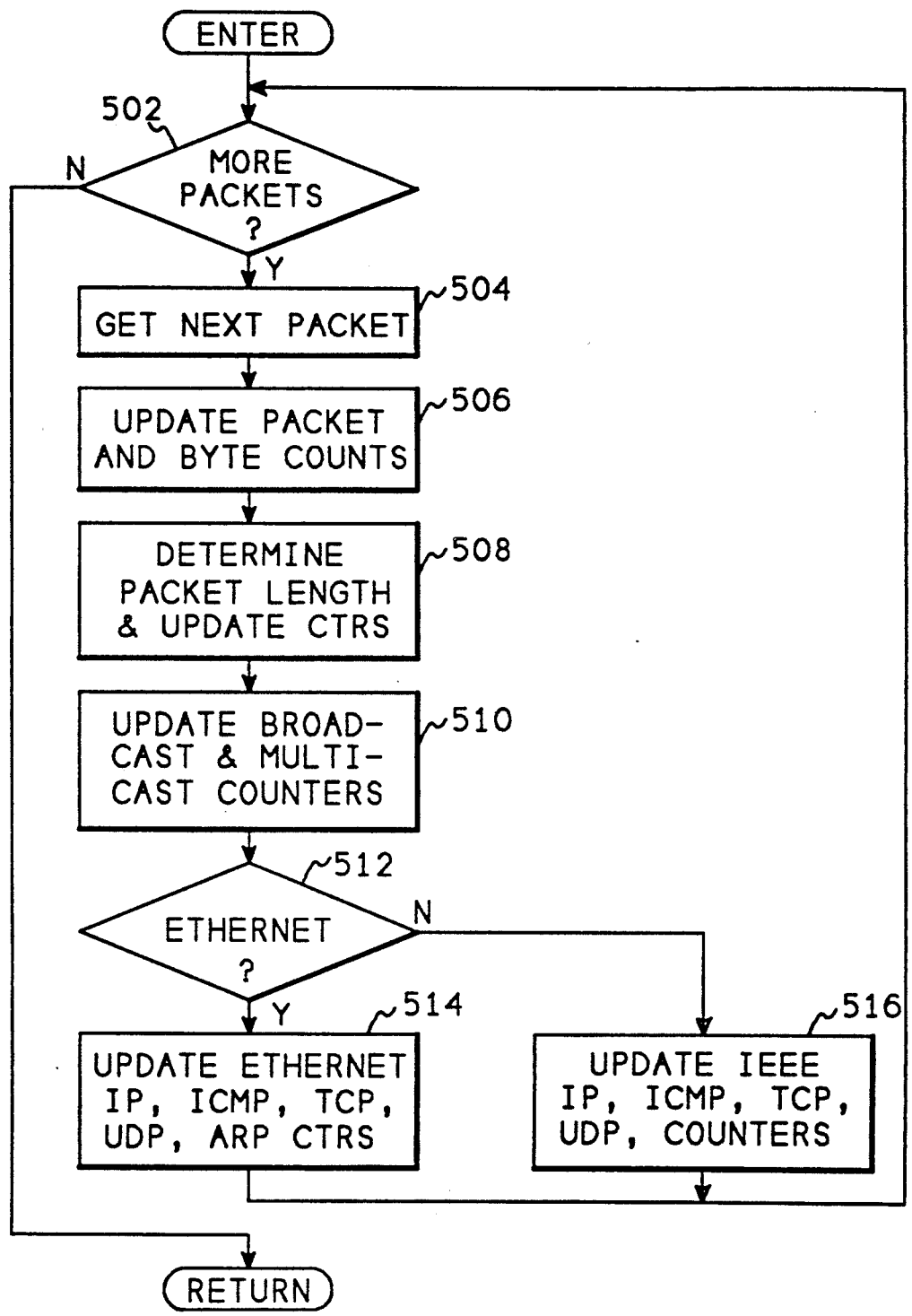
FIG. 5 shows a flowchart of the parse packet routine called from FIG. 4.

FIG. 5 shows a flow chart of the parse packet routine called from FIG. 4. After entry block 502 determines whether there are more packets available in the buffer passed from FIG. 4. If there are more packets available, block 502 transfers to block 504 which gets the next packet that was collected from the LAN driver module 104. Block 506 then updates the packet count and byte counts in the shared memory 108. The shared memory 108 contains a counter for the total number of packets transmitted across the LAN 103, and also a counter for the total number of bytes from all the packets. Block 50 then determines the packet length and updates counters for various lengths. The collector process 106 maintains separate counters for packets having lengths of up to sixty four (64) bytes, sixty five (65) to one hundred forty (140) bytes, one hundred forty one (141) to five hundred twelve (512) bytes, five hundred thirteen (513) to twelve hundred (1200) bytes, and a counter for packets larger than twelve hundred (1200) bytes. These counters are used to display data in the traffic distribution display described below.

Block 510 then updates broadcast or multicast counters in shared memory if the packet is for a broadcast or multicast record. Block 512 then determines whether the packet is for an ETHERNET local area network or for an IEEE 802.3 local area network. If the packet is for an ETHERNET local area network, block 512 transfers to block 514 which updates a set of ETHERNET counters depending upon whether the packet is an IP, ICMP, TCP, UDP, or ARP packet. If the packet is for an IEEE 802.3 network, block 512 transfers to which updates a set of IEEE 802.3 counters depending on block 516 whether the packet is a IP packet, ICMP, TCP, or UDP packet. After updating these counters control transfers back to block 502 to process the next packet in the buffer. After all packets in the buffer have been processes, block 502 returns to FIG. 4.

Figure 6:
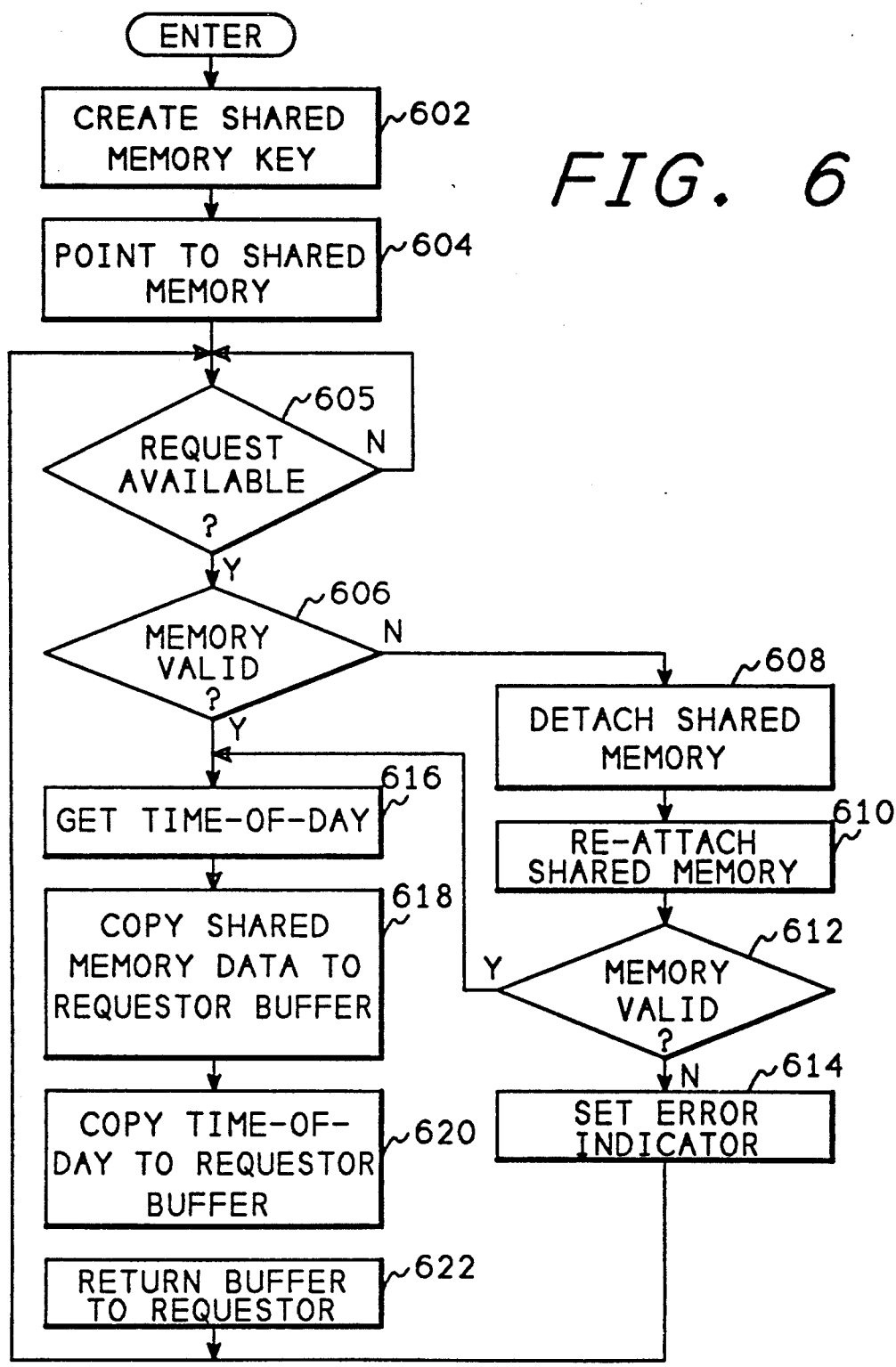
FIG. 6 shows a flowchart of the agent process of FIG. 1.

FIG. 6 shows a flow chart of the agent process 110 of FIG. 1. The agent process 110 is responsible for copying the statistics from the shared memory 108 and returning those statistics to an archiver process in a management node. This is accomplished when the archiver process from the management node requests the statistics be collected. Therefore, the flow chart of FIG. 6 is entered when a request is received from an archiver process. Referring now to FIG. 6, after entry, block 602 creates a shared memory key for accessing the shared memory 108. This key must be identical to the key created by the collector process 106, as described above with respect to FIG. 4. Block 604 points to the shared memory and block 605 waits for a request for the data from the management node. When a request is received, block 606 determines whether the shared memory is valid. The shared memory will be valid if the collector process is currently running but may be invalid if the collector process has been canceled. If the shared memory is not valid, block 606 transfers to block 608 which detaches shared memory and then block 610 tries to reattach shared memory to obtain a different area. If the collector process has been stopped and restarted, it may be collecting data into a new shared memory area, and block 610 attempts to reattach to the new shared memory area. Block 610 then transfers to block 612 which determines whether the new area is valid and if the shared memory area is valid, control transfers to block 616. If the new memory area is not valid, block 612 transfers to block 614 which sends an error indicator back to the archiver process and returns.

If the shared memory area is valid, control transfers to block 616 which gets the current time of day. Block 618 then copies the shared memory data to a requestor buffer so that it can be sent back to the requesting archiver process. Block 620 then copies the time of day to the requestor buffer. Since the collector process placed the statistics collection start time of day into shared memory, and the agent process returns the time of day that the statistics were collected, the archiver process can compute the duration for this set of statistics. After the data and time of day have been placed into the requestor buffer, block 622 returns the buffer to the requestor and then transfers to block 605 to wait for the next request.

Figure 7:
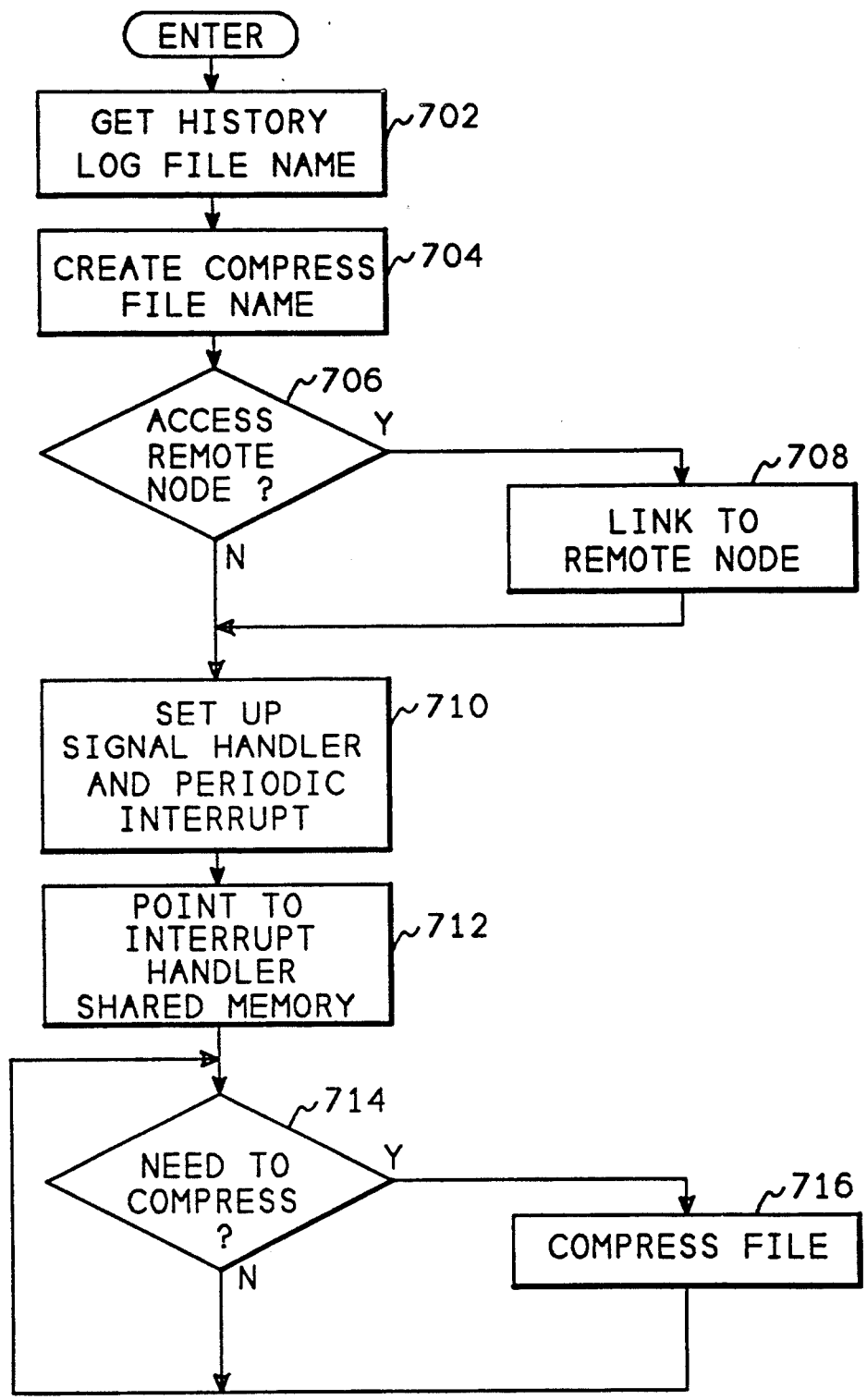
FIG. 7 shows a flowchart of the archiver process of FIG. 1.

FIG. 7 shows a flow chart of the archiver process 112 of FIG. 1. Referring now to FIG. 7, after entry, block 702 gets the name of the history log file from the parameter list. Block 704 then creates a name, based on the history log file name, to use for compressing the log file. Block 706 determines whether the data for the log file will be transferred from a remote node or from the shared memory of the management node. If the data will be from a remote node, block 706 transfers to block 708 which creates a link to the remote node. After linking to the remote node, or if data will be obtained from the shared memory of the local node, block 706 transfers to block 710 which sets up the signal handler to handle interrupts, and it also sets up a periodic interrupt, typically one per second, which determines the periodic sample rate. Block 712 then points to memory shared with the interrupt handler in order to access the compress flag, and block 714 determines whether there is a need to compress the history file. If there is a need to compress the history file, block 714 transfers to block 716 which performs the compression. FIG. 7 then loops while checking for the need to compress the history log file, while the interrupt handler receives data and stores in the history file. Once per hour the interrupt handler will set a flag indicating a need to compress, block 714 will detect this need and perform the compression.

Figure 8:
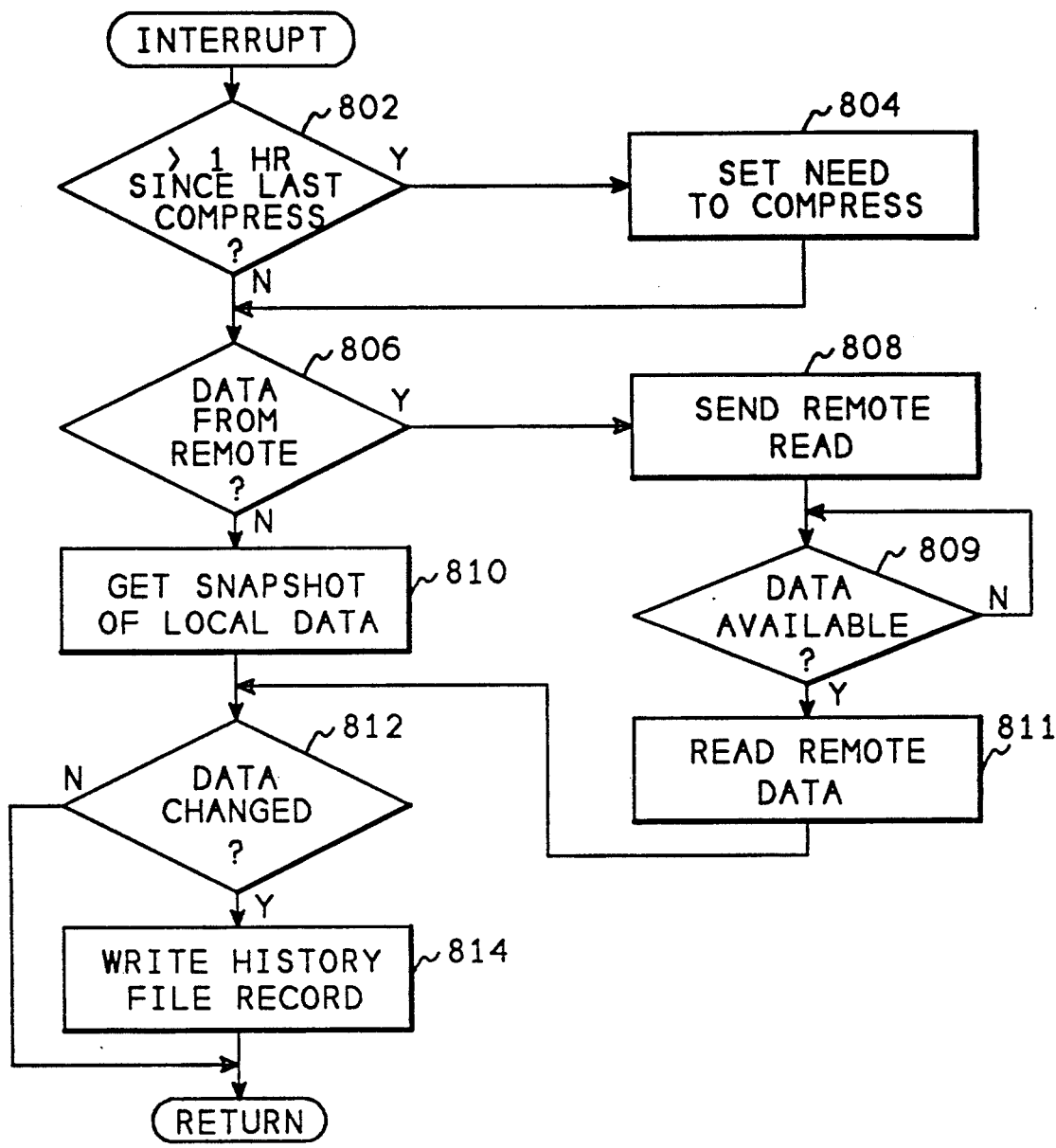
FIG. 8 shows a flowchart of the interrupt handler of the archiver process of FIG. 7.

FIG. 8 shows a flow chart of the interrupt handler for the archiver process 112. This flow chart is entered periodically (as set up by block 710 of FIG. 7) to obtain data from the remote node or shared memory of the management node. Referring now to FIG. 8, after entry, block 802 determines whether an hour has passed since the last compression of the history file. If at least one hour has passed, block 802 transfers to block 804 which sets a flag in shared memory to indicate to FIG. 7 that file compression is needed. After setting the indicator in memory or if less than one hour has passed, control transfers to block 806 which determines whether data is being collected from a remote node. If data is being collected from a remote node, block 806 transfers to block 808 which sends a request to the remote node for the data. Block 809 then waits for the data to arrive, and after the data arrives, block 809 transfers to block 812.

If data is being obtained from the local node, block 806 transfers to block 810 which gets a snapshot of the local data in the shared memory of the management node. Block 812 then determines whether the data has changed since the last snapshot and, if not, block 812 simply returns. If data has changed since the last snapshot, block 812 transfers to block 814 which writes a new record to the history file.

Figure 9:
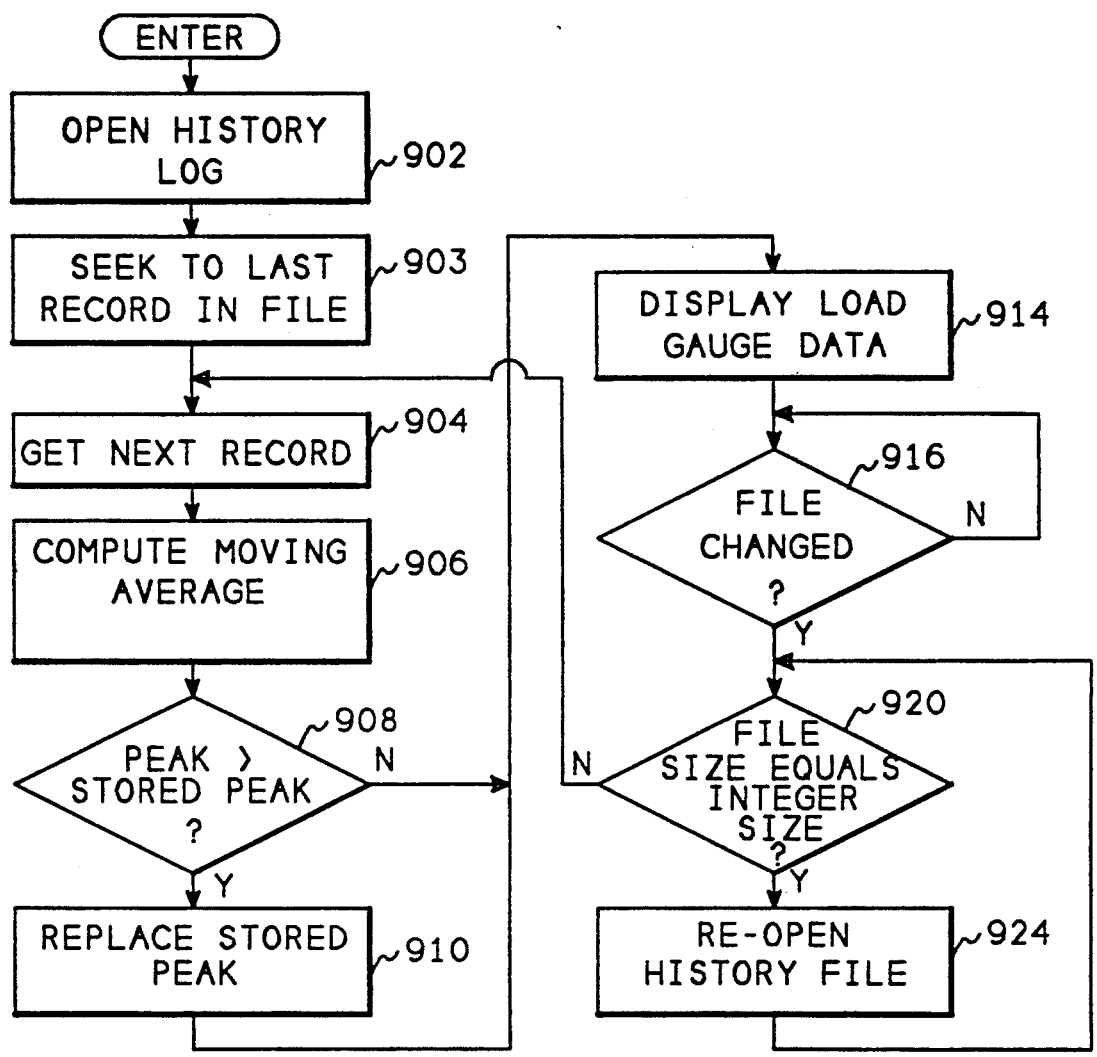
FIG. 9 shows a flowchart of the load gauge display process of FIG. 1.

FIG. 9 shows a flow chart of the load gauge display process 120 of FIG. 1. This process resides in memory of the management node and runs concurrently with the archiver process and the other display processes. Referring now to FIG. 9, after entry, block 902 opens the history log file, block 903 seeks to the last record in the file, and block 904 gets the last record from the file. Block 906 then re-computes the moving average to account for the data just read and block 908 determines whether the peak data just read is larger than the stored peak for the display. If the peak data just read is larger, block 908 transfers to block 910 which stores this new peak data for the display. Control then transfers to block 914 which displays the load gauge data on the display, as shown and described with respect to FIG. 10 below. Block 914 then transfers to block 916 which determines whether the history file has changed since the last read. If the file has not changed since the last read, block 916 transfers back to itself, therefore, block 916 simply waits until a new record has been written to the history file. In this manner, the load gauge display is dynamically updated to a user watching the display screen of the management node.

When the history file changes, block 916 transfers to block 920 which determines whether the file size of the history file has been truncated to the length of an integer in the current system, typically four (4) bytes. When the archiver process compresses the history file, it does so by copying the current history file to a new history file during the compression. After the compression is complete, the archiver process reduces the length of the current history file to the length of an integer, and in this integer it places the number of records removed from the new history file. This number is then used to locate the original record position in the new file. Therefore, if the history file length has been reduced to the length of an integer value, the load gauge process of FIG. 9 knows that a compression has occurred and transfers to block 924 to close the current history file and reopen the new history file to access the current data. If the file size is not equal to an integer, the history file has not been compressed so block 920 transfers to block 904 which reads the new data, computes new averages and peak values and then transfers back to 914 to display these new values.

Figure 10:
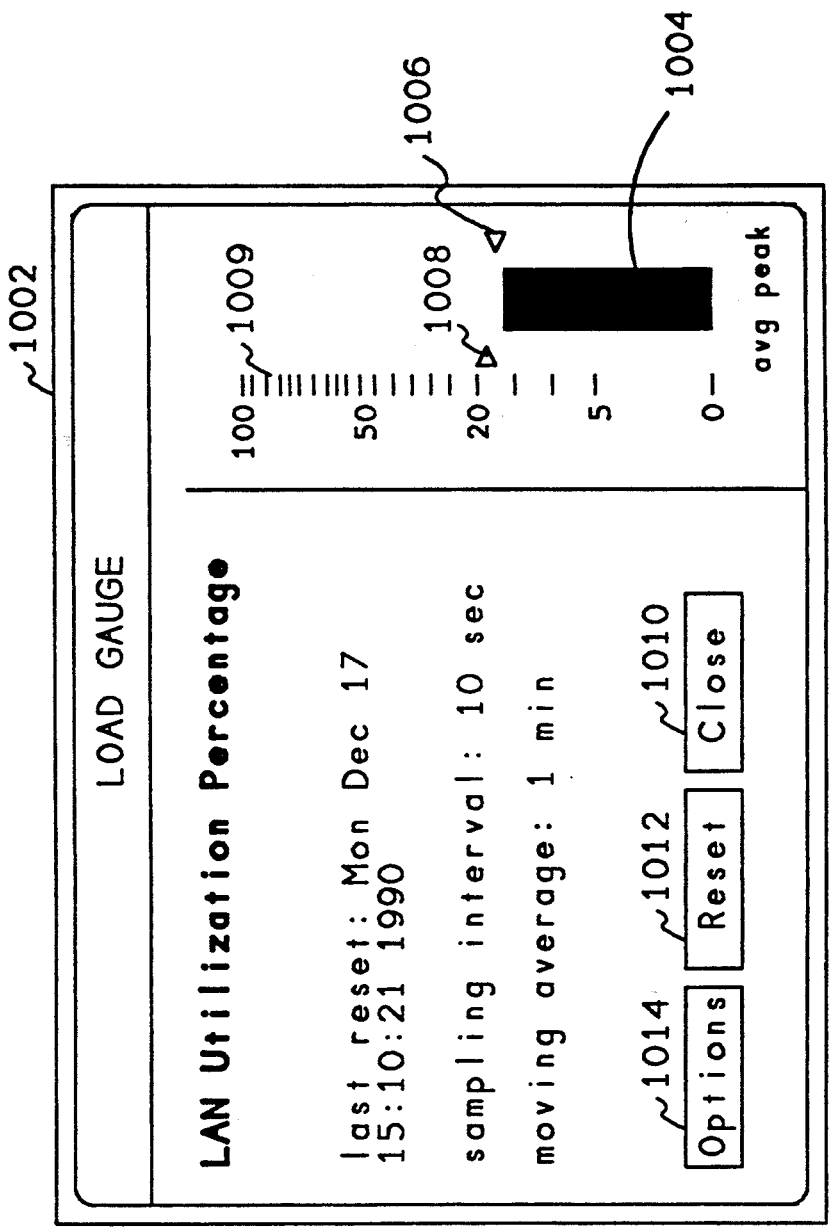
FIG. 10 shows a screen display for the load gauge process.

FIG. 10 shows a screen display for displaying the load gauge data collected and displayed by FIG. 9. Referring now to FIG. 10, a load gauge display 1002 shows three different information values which are accumulated by the process of FIG. 9. The solid bar 1004 shows the load over the last sampling interval. The hollow arrow 1006 shows the peak data and the solid arrow 1008 shows the moving average of the data over the last one minute. All this data is displayed on a quadratic scale 1009.

The example display shown in FIG. 10 is for a windows environment, therefore, graphic display buttons 1010, 1012, and 1014 are available to allow the user to close the display, reset 10 the accumulated values, or reconfigure the load gauge display process, respectively.

Figure 11:
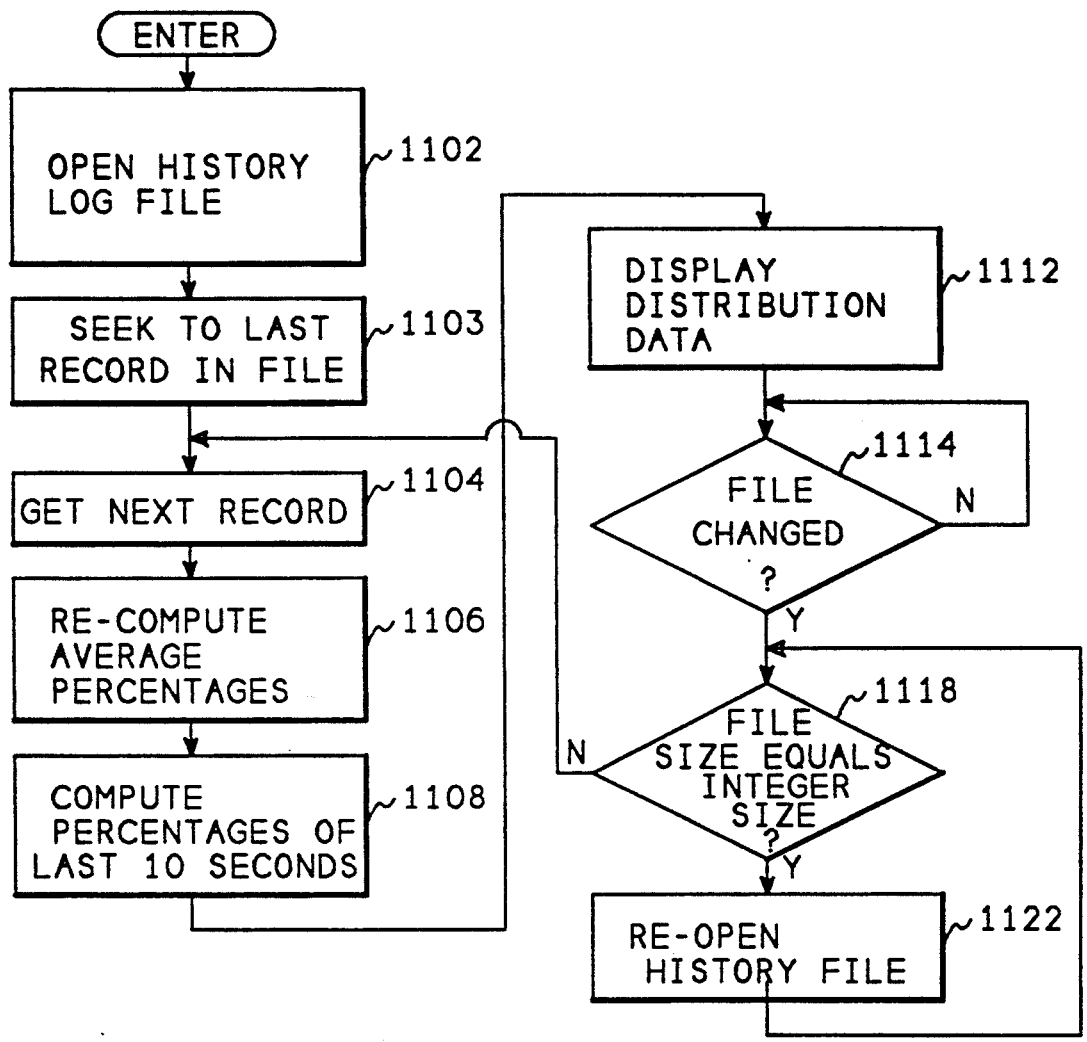
FIG. 11 shows a flowchart of the traffic distribution display process of FIG. 1.
Figure 12:
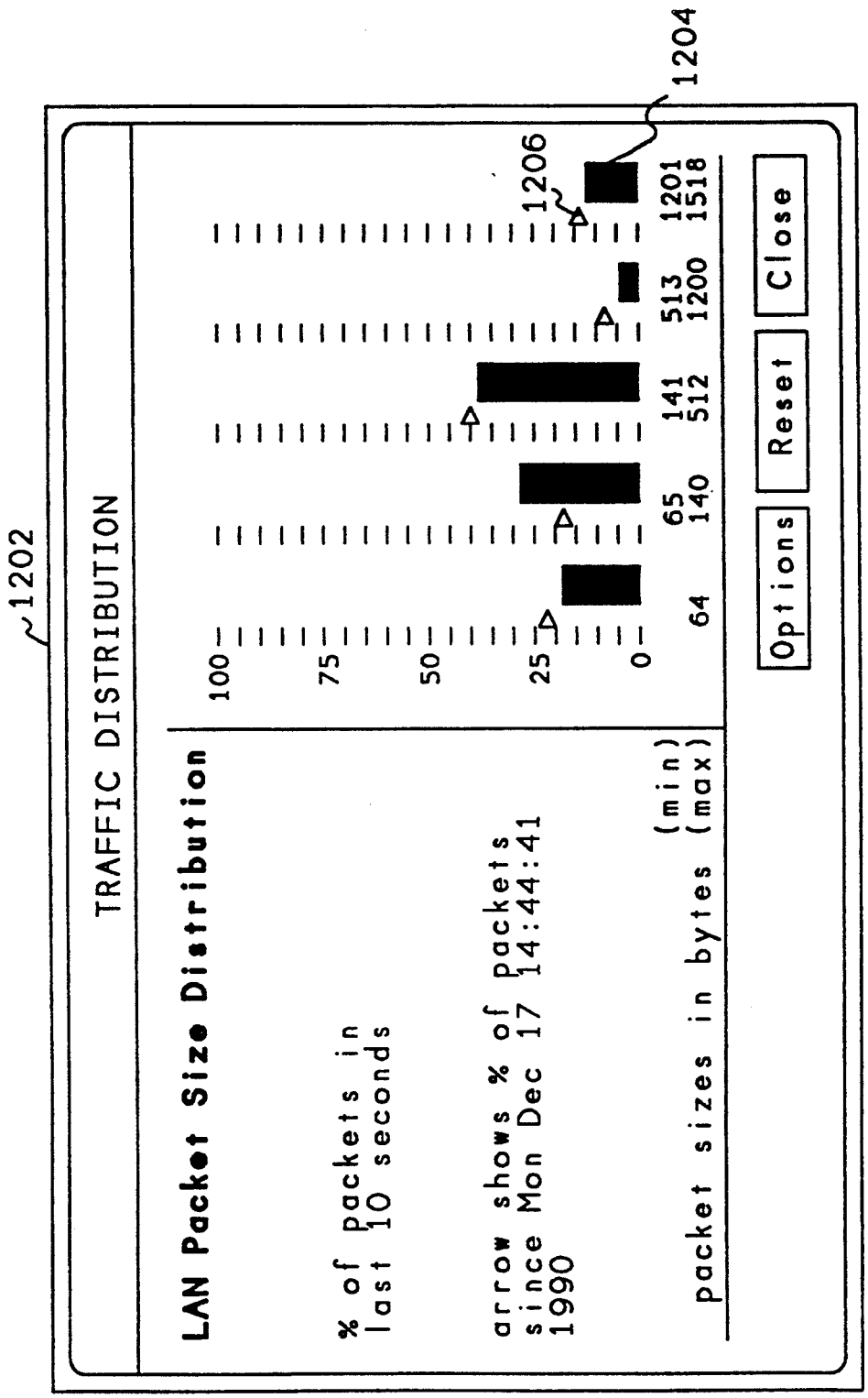
FIG. 12 shows a screen display for the traffic distribution process.

FIG. 11 shows a flow chart of the traffic distribution process 118 of FIG. 1. The traffic distribution process 118 runs concurrently with the archiver process and the other display processes within the management node. Referring now to FIG. 11, after entry, block 1102 opens the history log file, block 1103 seeks to the last record in the file, and block 1104 reads the last record from the log file. Block 1106 then computes the average percentages, and block 1108 computes the percentages for the record lengths over the last ten seconds. Block 1112 then displays the traffic distribution data on a display, which is shown in FIG. 12 and described below. Block 1114 then determines whether the history file has changed since the last read and, if not, block 1114 simply waits for the file to change. In this manner, the traffic distribution display is a real time display and dynamically updates the display on the management node. When the history file changes, block 1114 transfers to block 1118 which determines whether the file size of the history file has been reduced to the length of an integer value. As discussed above with respect to FIG. 9, this reduction in length occurs when the archiver process compresses the history file. If the length has been reduced, block 1118 transfers to block 1122 which reopens the history file in order to access the new, compressed, history file. If the file size is not equal to an integer block 1118 transfers to block 1104 which reads the last record, computes the new percentages, and then transfers back to block 1112 to display the new percentages.

FIG. 12 shows an example display for the traffic distribution data collected and displayed by the process of FIG. 11. Referring now to FIG. 12, a traffic distribution display 1202 contains five gauge displays similar to the gauge display of FIG. 10. Each of the five gauge displays of FIG. 12 shows a distribution for one of the record lengths accumulated in the process of FIG. 11. Within each of the gauge displays, the vertical bar shows the percentage of packets of the indicated length that have occurred in the last ten seconds, and the arrowhead shows the percentage of packets of that length that have occurred since the date and time indicated on the left side of the display. For example, the bar 1204 shows the percentage of packets of length Twelve Hundred One (1201) bytes to Fifteen Hundred Eighteen (1518) bytes that have occurred in the last ten seconds and the arrowhead 1206 shows the percentage of packets of length Twelve Hundred One (1201) to Fifteen Hundred Eighteen (1518) since the date and time indicated on the left side of the display.

Having thus described a presently preferred embodiment of the present invention, it will now be appreciated that the objects of the invention have been fully achieved, and it will be understood by those skilled in the art that many changes in construction and circuitry and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

What is claimed is:

1. A method for collecting and displaying statistical data for a plurality of local area networks, said process comprising the steps of:
   (a) collecting the statistical data in a first task in each of a plurality of multi-tasking remote computer systems, one of said plurality of multi-tasking remote computer systems connected to each of the plurality of local area networks, said method comprising the steps of
      (a1) receiving each transmission on the local area network,
      (a2) collecting the local area network transmission data,
      (a3) reducing said transmission data to create the statistical data, and
      (a4) storing the statistical data in a shared random access memory area;
   (b) retrieving said statistical data from said shared random access memory area into a second task of each of said remote computer systems, and transferring the statistical data to a management node computer system, wherein said first and second tasks operate concurrently; and
   (c) receiving, assembling, storing, and displaying the statistical data in said management node computer system.

2. The method of claim 1 wherein step (c) further comprises the steps of:
   (c1) receiving the statistical data from said remote computer systems and storing the statistical data in a history file; and
   (c2) reading said history file and displaying the statistical data in a plurality of formats.

3. The method of claim 2 wherein step (c1) further comprises the step of compressing said history file.

4. The method of claim 3 wherein step (c2) further comprises the steps of dynamically reading said history file and dynamically updating said formats to show new data read.

5. The method of claim 3 wherein step (c2) further comprises the step of detecting said compressing of said history file and using a new, compressed, file.

6. The method of claim 3 wherein step (c1) further comprises the step of indicating a compressed file by reducing the length of the compressed file to a predetermined value.

7. The method of claim 2 wherein steps (c1) and (c2) are performed concurrently within said management node computer system.

8. The method of claim 1 wherein steps (a) and (b) are performed concurrently within each of said remote computer systems.

9. The method of claim 1 further comprising the step of collecting statistical data within said management node computer system.

10. A system for collecting and displaying statistical data for a plurality of local area networks, said system comprising:
    means located in a first task of each of a plurality of multi-tasking remote computer systems, one computer system connected to each of the plurality of local area networks, for collecting the statistical data, said mans comprising
       LAN driver means for receiving each transmission on the local area network,
       collector means for receiving local area network transmission data from said LAN driver means and reducing said data to create the statistical data, and
       shared random access memory means for storing the statistical data created by said collector means;
    management node means for assembling, storing, and displaying the statistical data;
    means located in a second task of each of said multi-tasking remote computer systems for retrieving said statistical data from said shared random access memory means and transferring said statistical data to said management node computer system, wherein said first and second tasks operate concurrently; and
    means located in said management node for receiving said statistical data transferred from each of said remote computer systems.

11. The system of claim 10 wherein said management node means comprises:
    archiver means for receiving the statistical data from said remote computer systems and storing the statistical data in a history file; and
    a plurality of display means for displaying the statistical data in a plurality of formats.

12. The system of claim 11 wherein said archiver means further comprises means for compressing said history file.

13. The system of claim 12 wherein each of said plurality of display means comprises means for dynamically reading said history file and dynamically updating said formats to show new data read.

14. The system of claim 12 wherein each of said plurality of display means comprises means for detecting said compressing of said history file and using a new, compressed, file.

15. The system of claim 12 wherein said means for compressing said file comprises indicating a compressed file by reducing the length of the compressed file to a predetermined value.

16. The system of claim 11 wherein said archiver means and said display means operate concurrently within said management node computer system.

17. The system of claim 10 wherein said collector mans and said transferring means operate concurrently within said remote computer system.

18. The system of claim 10 further comprising means located in said management node means for collecting the statistical data.

* * * * *